(12) United States Patent
Hirano et al.

(10) Patent No.: US 7,046,807 B2
(45) Date of Patent: May 16, 2006

(54) DATA ADMINISTRATION METHOD

(75) Inventors: Hideyuki Hirano, Kawasaki (JP);
Shinji Hashimoto, Kawasaki (JP); Eiki Hattori, Shizuoka (JP); Shigetoshi Mochizuki, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 09/811,550

(22) Filed: Mar. 20, 2001

(65) Prior Publication Data

US 2002/0059522 A1 May 16, 2002

(30) Foreign Application Priority Data

Nov. 10, 2000 (JP) ............................. 2000-342753

(51) Int. Cl.
*H04N 7/167* (2006.01)
*H04K 1/00* (2006.01)
*H04L 9/00* (2006.01)

(52) U.S. Cl. ...................... 380/234; 380/232; 380/250; 713/176; 713/179

(58) Field of Classification Search ........ 713/200–202, 713/176, 160, 179; 380/234, 232, 250; 705/58
See application file for complete search history.

(56) References Cited

U.S. PATENT DOCUMENTS

| | | | |
|---|---|---|---|
| 6,005,936 A | 12/1999 | Shimizu et al. | |
| 6,182,218 B1 * | 1/2001 | Saito | ......................... 713/176 |
| 6,223,285 B1 * | 4/2001 | Komuro et al. | ............. 713/160 |
| 6,775,655 B1 * | 8/2004 | Peinado et al. | ................ 705/59 |
| 2002/0069359 A1 * | 6/2002 | Watanabe | ................... 713/176 |

FOREIGN PATENT DOCUMENTS

| | | |
|---|---|---|
| JP | 10-16459 | 6/1998 |
| JP | 10-164550 | 6/1998 |
| JP | 10-294726 | 11/1998 |
| JP | 11-232779 | 8/1999 |
| JP | 2000-268096 | 9/2000 |
| JP | 2000-268497 | 9/2000 |

OTHER PUBLICATIONS

"Asymmetric Fingerprinting", B. Pfitzmann, et al., Advances in Technology—EUROCRYPT '96, International Conference on the Theory and and Application of Cryptographic Techniques, Saragossa, Spain, May 12-16, Proceedings, Ueli Maurer (Ed.), pp. 84-95.*

Office Action issued Nov. 22, 2005 for corresponding Japanese Application.

* cited by examiner

*Primary Examiner*—Matthew Smithers
*Assistant Examiner*—Courtney Fields
(74) *Attorney, Agent, or Firm*—Staas & Halsey LLP

(57) ABSTRACT

Data administration method which prevents the infringement of a copyright by encrypting and distributing digital content, and readily grasps which contents are contained in the digital content included in the data. Preparing symbol information symbolized so as to visually and auditorily recognize the contents of the digital content that conduct distribution (Step S12), embedding the symbol information in a header data section (Step S13), encrypting the digital content (Step S15), embedding consent information including the information on the contents key in the header data section as an electronic watermark (Step S16), and compositing the real data section and the consent-information-added header data section and distributing the composite data (Step S17).

20 Claims, 14 Drawing Sheets

| Data Kind | Symbol Info. | Expansion Factor |
|---|---|---|
| Music |  | mp3 |
| Image |  | jpg |
| Publications |  | lit |

| Watermark Embedding Class | Header Data Section | Real Data Section |
|---|---|---|
| 1111 | Type1-Version1 | Type1-Version1 |
| 2111 | Type2-Version1 | Type1-Version1 |
| 1100 | Type1-Version1 | — |

| Image Quality Request | Security Request | Real Data Section Creation Example |
|---|---|---|
| Low | Low | Invisible Watermark, Not Encrypted |
| Low | High | Invisible Watermark, Encrypted |
| High | Low | Watermark Unnecessary, Not Encrypted |
| High | High | Visible Watermark, Encrypted |

DATA ADMINISTRATION METHOD

BACKGROUND OF THE INVENTION

1. Technical Field

The present invention relates to a data administration method, and more particularly to data operating administration in encrypting and distributing digital content.

2. Description of Related Art

In software such as a computer program and in electronic publications, electronic data is stored on magneto optical disks (MOs), digital video disks (DVDs), floppy disks (FDs), mini-disks (MDs) or other recording media and then sold. Such electronic data is in general easily copied, and unfair copies are made frequently. Therefore, there is a risk that copyrights on the software vendor's or publisher's end will be infringed, damaging profits dramatically.

Likewise unfair copies are frequently made of electronic data, including still image data, moving image data, audio data or music data, that is distributed through the internet, CATV or other networks, spoiling copyright holders' profits.

Thus in order to protect so-called digital content such as electronic data stored on recording media and electronic data distributed through various networks, the digital content is encrypted by using an encryption key, and the encrypted real data is distributed.

For example, a conceivable case is that of a user gaining access from a personal computer to content on a distributor end, and downloading the digital content onto and using it from the user's hard disk. First, the user accesses a host computer and gets a plug-in module for downloading. Thereafter, an identification number for the hard disk drive being used, an identification number for the CPU being used, and user-specific identification information are sent to the host computer end.

On the content distributor end, real data in which digital content is encrypted with a content key, and consent information in which the content key is encrypted with the user-specific identification information, is transmitted to the user end.

On the user end, the encrypted real data sent in, and the consent information are recorded on the hard disk in the as-is-encrypted state. When the digital content is to be used, utilizing the hard disk drive identification number and other user-specific identification information, the consent information is decrypted to obtain the content key. The encrypted digital content is decrypted using the content key and then used.

In this case, in granting to users individually the right to use digital content, the encryption key for encrypting the digital content can be made common, and encrypting decryption keys using user-specific identification information that is different for each user enables use rights to be granted individually.

Distributing data by the above-described method necessitates that the data distributor send encrypted digital content, and consent information that becomes a decryption key for the encrypted digital content, separately.

Also, on the user end encrypted digital content and its consent information sent in have to be stored onto the recording medium separately.

Consequently, in instances in which consent information is destroyed en route while being sent from the data distributor end to the user end, or else due to some accident on the user end, consent information on the recording medium is destroyed or lost, the digital content becomes unusable. This makes it necessary once again to go through the procedure for obtaining the consent information.

Furthermore, where image data is taken from library manuscripts and art museum collections by photographing or scanning and made available to users, complete encryption of the image data makes it difficult on the user end to specify desired image data before the exchange for consent information is carried out. Accordingly, it would be desirable to manage the data so that a part of the image can be recognized on the user end, and moreover so that the data cannot misappropriated.

Not only in cases in which still- or moving-image image data is encrypted and distributed, but also in which audio data and music data is, being able to recognize visually or auditorily what sort of digital content is contained in data would be convenient for the user.

SUMMARY OF THE INVENTION

An object of the present invention is to provide a data administration method which prevents the infringement of a copyright by encrypting and distributing the digital content and which is easy to grasp what are the digital content contained in data.

According to the present invention, there is provided a data administration method comprising the steps of: producing a real data section by encrypting digital content that conducts distribution; producing a header data section having a symbolized symbol information so as to visually and auditorily recognize the attribute of the digital content; producing a consent information added header data section in which consent information containing the information of a contents key used as a encryption key when the digital content are encrypted is embedded in the header data section as an electronic watermark; and producing synthetic data obtained by synthesizing the real data section and said consent information header data section to distribute the synthetic data.

The header data section may be structured by synthesizing one and more image symbol data which is symbolized so that the contents of the image symbol data can be visually recognized in correspondence with a plurality of digital content, respectively, within one image data.

Also, according to the present invention, there is provided a data administration method comprising the steps of: producing a real data section by encrypting digital content that conducts distribution; producing a header data section so as to visually and auditorily recognize the contents of the digital content; producing a consent information added header data section in which consent information containing the information of a contents key used as a encryption key when the digital content are encrypted is embedded in the header data section as a visually or auditorily unrecognizable electronic watermark; producing an annex data section in which a use restriction information for limiting the use of the digital content is decoded; and synthesizing the annex data section together when synthesizing the real data section and the consent information added header data section to produce and distribute the synthetic data.

In this situation, as the use restriction information, an embedding logic when the consent information is embedded in the header data section as the electronic watermark can be employed.

Also, the use restriction information can be based on a use term during which the digital content can be used or the number of times of uses.

In addition, the use restriction information can be encrypted with the individual information of the user of the digital content as an encryption key.

The encryption key when encrypting the use restriction information can be a password which is preset by the user, ID information inherent to a recording medium in which the synthetic data is recorded, or biometric information of the user.

According to the present invention, there is provided a data administration method comprising the steps of: separating an annex data section from distributed synthetic data synthesized from a real data section in which digital content that conducts distribution is encrypted, a consent information added header data section in which consent information containing the information of a contents key used as a encryption key when the digital content are encrypted is embedded as a visually or auditorily unrecognizable electronic watermark in a header data section in which the contents of the digital content can be visually and auditorily recognized; an annex data in which the use restriction information is encrypted to conduct the use limit of the digital content; encrypting the annex data section to extract the use restriction information; extracting the consent information embedded in the consent information added header data section on the basis of the use restriction information; obtaining a contents key for decrypting the digital content from the consent information; and decrypting the real data section to an original digital content by using the contents key, which is used by the user.

Also, according to the present invention, there is provided a data administration method comprising the steps of: producing a real data section by encrypting digital content that conducts distribution; producing a header data section so as to visually and auditorily recognize the contents of the digital content; producing a consent information added header data section in which consent information containing the information of a contents key used as a encryption key when the digital content are encrypted is embedded in the header data section as a visually or auditorily unrecognizable electronic watermark; and synthesizing synthetic data obtained by synthesizing the real data section and the consent information added header data section after a hash value produced by using a hash function from the real data section is embedded in the header data section as a visually or auditorily unrecognizable electronic watermark, and distributing the synthetic data.

In addition, according to the present invention, there is provided a data administration method comprising the steps of: producing a real data section by encrypting digital content that conducts distribution; producing a header data section so as to visually and auditorily recognize the contents of the digital content; producing a consent information added header data section in which consent information containing the information of a contents key used as a encryption key when the digital content are encrypted and ID information inherent to a recorded recording medium are embedded in the header data section as a visually or auditorily unrecognizable electronic watermark; and producing synthetic data obtained by synthesizing the real data section and said consent information header data section to distribute the synthetic data.

In addition, according to the present invention, there is provided a data administration method comprising the steps of: producing a real data section by encrypting digital content that conducts distribution; producing a header data section so as to visually and auditorily recognize the contents of the digital content; producing a consent information added header data section in which consent information containing the information of a contents key used as a encryption key when the digital content are encrypted and a control code for conducting specific operation on an information device for reproducing the digital content are embedded in the header data section as a visually or auditorily unrecognizable electronic watermark; and producing synthetic data obtained by synthesizing the real data section and said consent information header data section to distribute the synthetic data.

In addition, according to the present invention, there is provided a data administration method comprising the steps of: producing a real data section by encrypting digital content that conducts distribution; producing a header data section having a symbolized symbol information so as to visually and auditorily recognize the contents of the digital content; producing a consent information added header data section in which consent information containing the information of a contents key used as a encryption key when the digital content are encrypted is embedded in the header data section as a visually or auditorily unrecognizable electronic watermark; and producing synthetic data obtained by synthesizing the real data section and said consent information header data section after the contents information of the digital content and given connected information are embedded to the header data section as a visually or auditorily unrecognizable electronic watermark in order to send out the contents information of the digital content that conducts demodulation by connecting a line to a given third party when the real data section is demodulated to the digital content, and distributing the synthetic data.

In addition, according to the present invention, there is provided a data administration method comprising the steps of: producing a real data section by encrypting digital content that conducts distribution; producing a header data section so as to visually and auditorily recognize the contents of the digital content; producing a consent information added header data section in which consent information containing the information of a contents key used as a encryption key when the digital content are encrypted is embedded in the header data section as a visually or auditorily unrecognizable electronic watermark; and allowing recorded location information of a server that registers the digital content to be held in the synthetic data when producing a synthetic data obtained by synthesizing the real data section and the consent information added header data section, and distributing the synthetic data.

The recorded location information of the server that registers the digital content can be embedded in the header data section as a visually and auditorily unrecognizable electronic watermark.

In addition, according to the present invention, there is provided a data administration method comprising the steps of: producing a real data section by encrypting digital content that conducts distribution; producing a header (summary) data section so as to visually and auditorily recognize the contents of the digital content; producing a consent information added summary data section in which consent information containing the information of a contents key used as a encryption key when the digital content are encrypted is embedded in the summary data section as a visually or auditorily unrecognizable electronic watermark; and allowing biometric template information produced on the basis of the biometric information of the user of the digital content to be held in the synthetic data, and distributing the synthetic data.

The biometric template information can be embedded in the summary data section as a visually and auditorily unrecognizable electronic watermark.

In addition, according to the present invention, there is provided a data administration method comprising the steps of: producing a real data section by encrypting digital content that conducts distribution; producing a header data section so as to visually and auditorily recognize the contents of the digital content; producing a consent information added header data section in which consent information containing the information of a contents key used as a encryption key when the digital content are encrypted is embedded in the header data section as a visually or auditorily unrecognizable electronic watermark; producing synthetic data by synthesizing the real data section and the consent information added header data section; and distributing the synthetic data, wherein privileges information including the copyright information of the digital content is embedded in the digital content as an electronic watermark.

In this case, a form of the electronic watermark embedded in the digital content and the code level can be determined on the basis of a data quality level and a security level which are required by the digital content.

Also, a system of embedding the electronic watermark in the digital content and a system of embedding the electronic watermark in the header data section can be made different.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
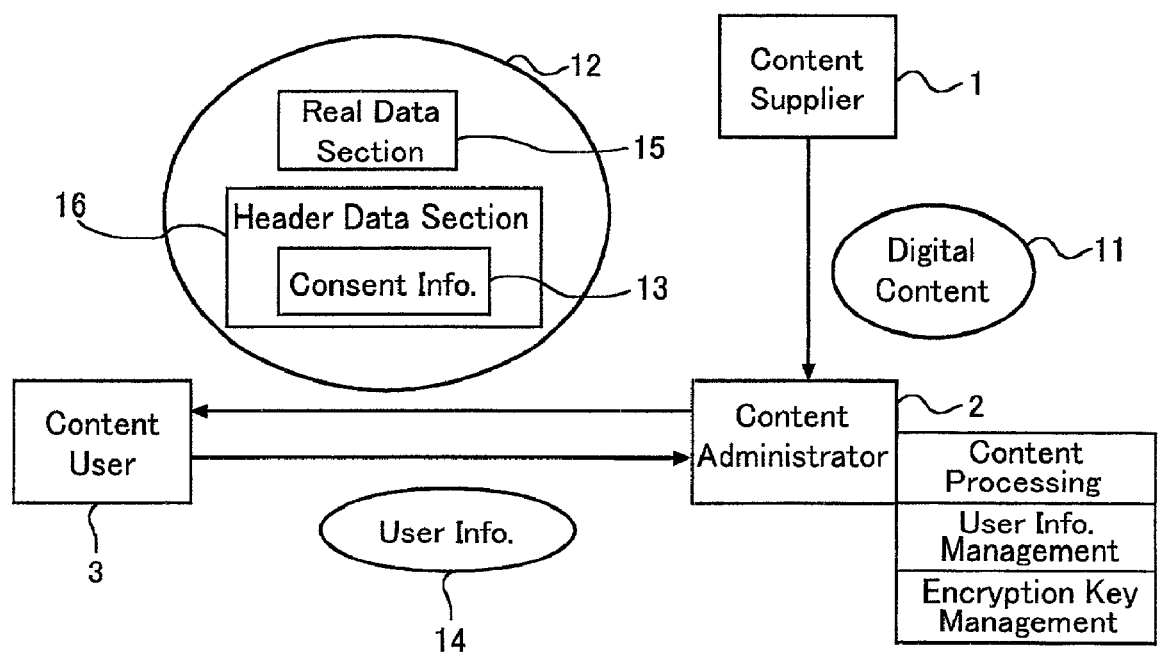
FIG. 1 is a block diagram showing the outline structure of the present invention.

FIG. 1 shows the structure of an outline of the present invention.

A contents supplier 1 is a copyright holder of the digital content and supplies to a content administrator 2 digital content 11 to be administered.

The contents manager 2 encrypts the digital content 11 supplied from the contents supplier 1 for administration, manages a contents key used as a encryption key for encrypting and manages the user information of users that use the digital content 11.

The contents user 3 transmits the user information 14 to the contents manager 2 in the case where the contents user 3 would like to employ the digital content that the contents manager 2 manages.

The contents manager 2 manages the user information 14 transmitted from the contents user 3, produces consent information 13 on the basis of the user information 14 and synthetic data 12 including a real data section 15 that encrypts the digital content and the consent information 13 to the contents user 3.

In this situation, the contents manager 2 produces the header data section 16 by using symbol information symbolized so as to visually and auditorily recognize the attribute of the digital content 11. The contents manager 2 encrypts the contents key used when encrypting the digital content 11 by the user information 14 to produce the consent information 13, and produces the consent information added header data section where the consent information is embedded in the header data section 16 as an electronic watermark. In addition, the contents manager 2 synthesizes the real data section 15 that encrypts the digital content and the consent information added header data section and transmits it to the contents user 3.

Figure 2:
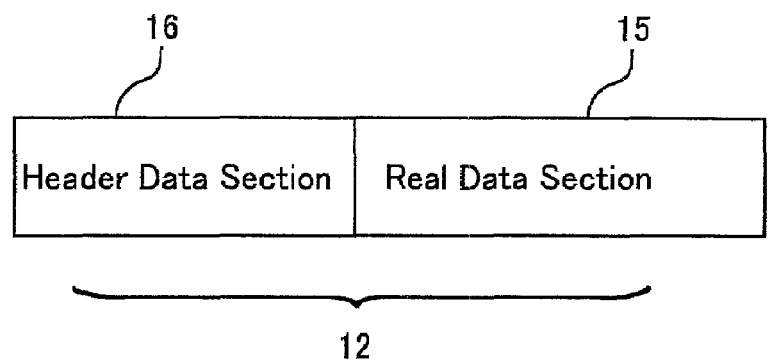
FIG. 2 is an explanatory diagram showing an example of a data structure.

The synthetic data section 12 is a data structure where the header data section 16 and the encrypted real data section 15 are synthesized as shown in FIG. 2. In the case where the contents manager 2 side and the contents user 3 side use predetermined data as the embedding logic when the consent information is embedded in the header data section 16 as the electronic watermark.

Figure 3:
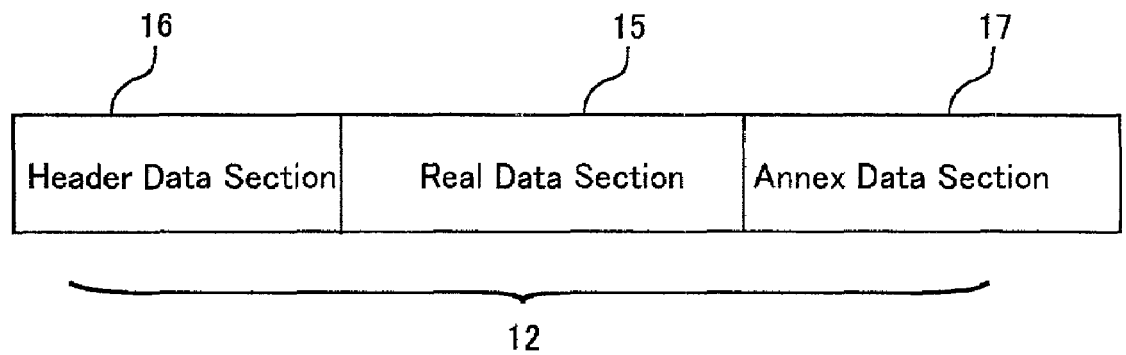
FIG. 3 is an explanatory diagram showing another example of a data structure.

In the case where the contents user 3 side is capable of decrypting the electronic watermark in correspondence with a plurality of embedding logics, it is necessary that the contents manager 2 includes information pertaining to the embedding logic in the synthetic data 12 and sends it. In this case, as shown in FIG. 3, it is proposed that the information pertaining to the embedding logic is stored in an annex data section 17 to produce the synthetic data 12 together with the header data section 16 and the real data section 15.

The annex data section 17 can store, in addition to the information pertaining to the embedding logic, the positional information pertaining to a position at which the consent information is embedded in the header data section as the electronic watermark and the size of the electronic watermark, the use restriction information pertaining to the use term of the digital content, the number of times of uses of limit, or the like, may be also stored. Also, there is proposed that the information stored in the annex data section 17 is encrypted. For example, the information is encrypted by the user information 14 used when producing the consent information.

In addition, the user information 14 which is a encryption key used when encrypting the consent information can be embedded in the header data section 16 as the electronic watermark, and can be stored in the annex data section 17. In this case, the contents user 3 can conduct the user certification before he reproduces the digital content and it can prevent the unfair use.

The contents supplier 1 may be identical with the contents manager 2.

Contents Manager

Figure 4:
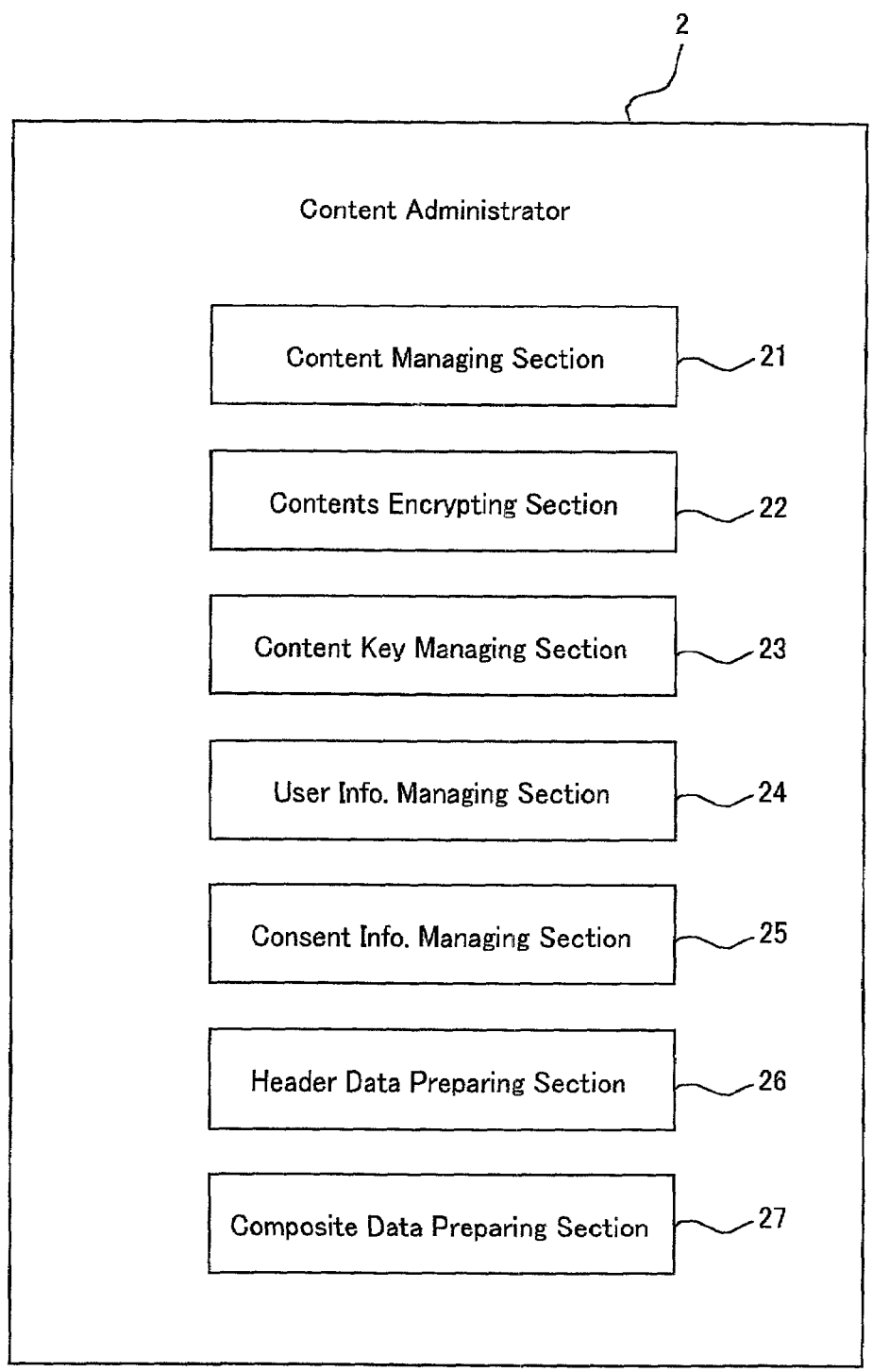
FIG. 4 is a block diagram showing the control of a contents manager.

FIG. 4 shows a functional block diagram of the outline structure of the contents manager 2 side.

The contents manager 2 side includes a contents managing section 21 that manages the contents that conduct the operation; a contents encrypting section 22 that encrypts the digital content by using a given contents key; a content key managing section 23 that manages the contents key; a user information managing section 24 that obtains the user information of the contents user 3 and manages the user information; a consent information managing section 25 that produces the use consent information of the digital content on the basis of the user information managed by the user information managing section 24 and manages the user consent information; a header data section 26 that produces a header data section having a symbol information symbolized so as to visually and auditorily recognize the contents of the digital content and embeds the consent information in the header data section as the electronic watermark; a synthetic data producing section 27 that synthesizes the real data section that encrypts the digital content by using the contents key and the consent information added data section; and so on.

Contents User

Figure 5:
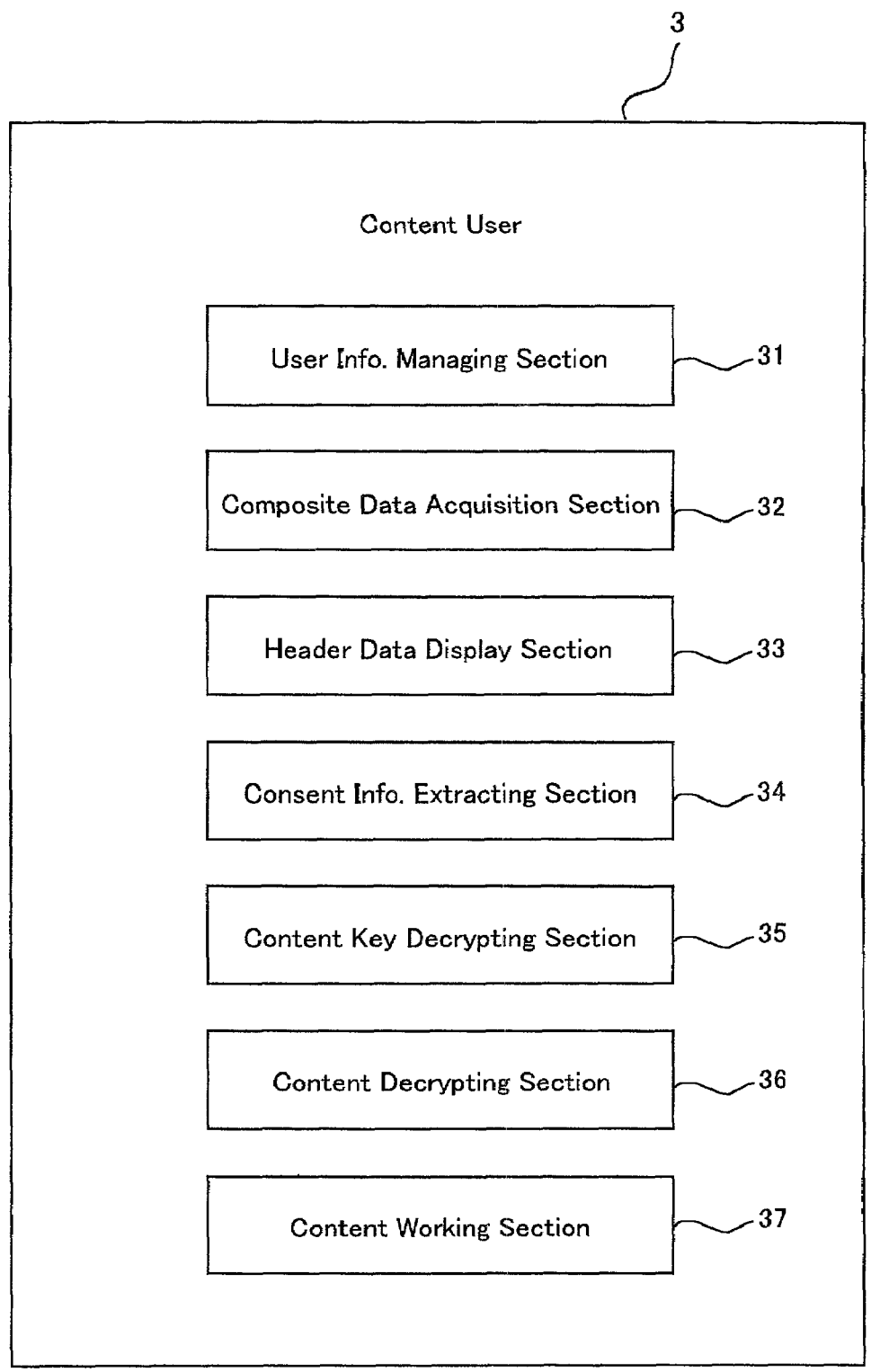
FIG. 5 is a block diagram showing the control of a contents user.

FIG. 5 shows a functional block diagram showing the outline structure of the contents user 3 side.

The contents user 3 side includes: a user information managing section 31 that manages the ID No. of the used hard disk drive, the ID No. of a CPU mounted on a computer and other ID information inherent to the user; a synthetic data obtaining section 32 for obtaining synthetic data from the contents manager 2; a header data display section 33 for displaying the header data section among the obtained synthetic data; a consent information extracting section 34 that separates the consent information from the consent information added header data section; a contents key decrypting section 35 that decodes the extracted consent information to reproduce the contents key; a contents decrypting section 36 that decodes the encrypted contents by using the decoded contents key; a contents operating section 37 that operates the decoded digital content, or the like.

Contents Distribution

Figure 6:
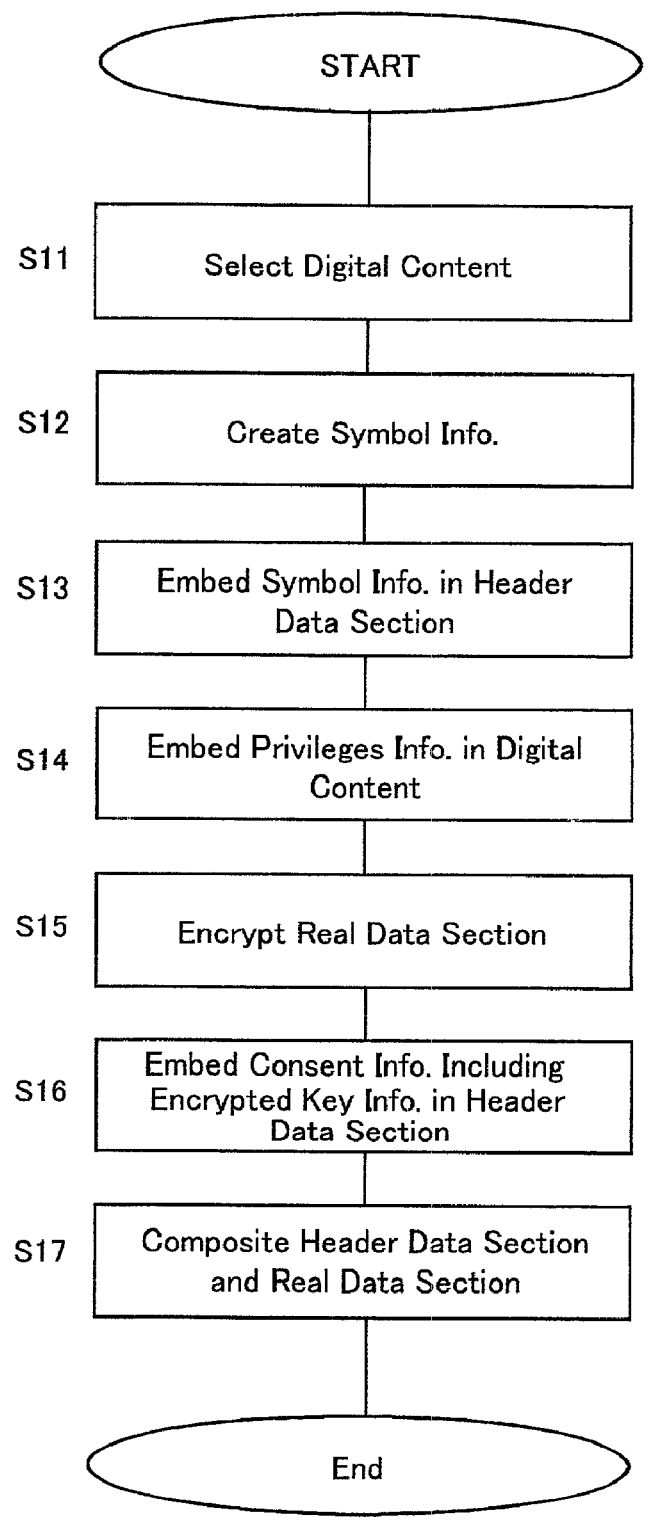
FIG. 6 is a flowchart showing the outline of the control.

A procedure of distributing the digital content at the contents manager 2 side will be described with reference to a flowchart shown in FIG. 6.

In step S11, the digital content stored in the synthetic data 12 that conducts distribution are selected. The digital content are still image data, moving image data, audio data, music data and electronic data including those data complexly. For example, the image data in the form of JPEG, TIFF, GIF, a bit map and other formats can be selected, and also audio data in the form of MP3,WAV and other formats can be selected.

In Step S12, in the respective selected digital content, symbol information is produced so that the attribute can be visually or auditorily recognized. The symbol information can be applied to icon corresponding to the data format of the digital content.

Figure 8:
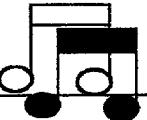
FIG. 8 is an explanatory diagram showing a table indicative of a correspondence of symbol information with its kind and the expansion factor.
Figure 8:
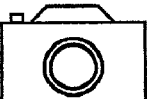
Figure 8:

For example, the respective symbol information may be used with the image data such as icon, and for example, as shown in a data table of FIG. 8, the respective symbol information can be defined in correspondence with the expansion factor based on the data kind, the symbol information and the data formation of the digital content.

In Step S13, the header data section 16 in which the symbol information produced in correspondence with the respective digital content is produced. In the header data section 16, for example, the symbol information of the respective digital content produced as the image data can be so structured as to be embedded in one image data. Also, in case of the audio data, the symbol information of the respective digital content can be one audio data sequentially connected to each other. Also, the symbol information embedded in the image data can be so structured as to have the audio data.

In Step S14, the privileges information is embedded in the respective digital content stored in the synthetic data 12. The privileges information exhibits the copyright information and the publish privileges information of the digital content, and the information is embedded in the digital content as occasion demands. The process of embedding the privileges information in the digital content can be embedded as an invisible or unauditory electronic watermark and can be embedded as a visual and auditory electronic watermark.

In step S15, the respective digital content stored in the synthetic data 12 is decoded by the respective corresponding contents keys to produce the real data section 15. The encrypting method can apply the various encrypting methods, and it is particularly preferable to conduct encrypting through a secret key encrypting system. In this case, the contents manager 2 side automatically produces the contents key in correspondence with the respective digital content, and produces the encrypted real data section by using the contents key. The contents key different in each of the digital content may be used. The respective digital content in the synthetic data may be encrypted by using the common content key.

In Step S16, the consent information including the information of the content key used when the digital content are encrypted is produced, and the consent information is embedded in the header data 16. The consent information can be the one obtained by encrypting the contents key used for encrypting the digital content by using the user information 14 inherent to the user who uses the contents. The user information 14 inherent to the user can be a password preset with respect to the user. Also, the user information 14 can be ID information of the information device used when the user operates the digital content, and for example, the serial No. of a CPU mounted on a personal computer, the serial No. of a drive such as a CD-ROM, a DVD, an MO, an FD or an HD may be applied. In this case, the password of the user or the ID information of the used information device are registered at the contents manager 2 side, and the contents key can be encrypted on the basis of the user information 14 thus registered.

In addition, as the user information 14 inherent to the user, the biometric information of the user can be used. For example, the fingerprint information, the retina information, the iris information, the voiceprint information of the user, etc., are registered at the contents manager 2 side in advance, and the contents key can be encrypted on the basis of the respective biometric information. For example, in the case where the contents key is encrypted by using the fingerprint information, the fingerprint image of the user is registered at the contents manager 2 side in advance. The contents manager 2 side analyzes the fingerprint image of the user as registered, extracts the characteristics which is called "manusha" such as the end point or branch point of the fingerprint image, and encrypts the contents key by the characteristic information.

In Step S16, the consent information 13 obtained by encrypting the contents key by the user information 14 is embedded in the header data section 16 as the electronic watermark. The embedment of the header data 16 in the consent information 13 can be made as the invisible or unauditory electronic watermark, and the consent information 13 may be inserted into a specific frequency band of the header data 16, a part of the data may be interpolated so that the consent information is inserted therein, and other methods are proposed.

In Step S17, the header data section 16 and the real data section 15 are synthesized to produce the synthetic data 12. In the case of requiring the annex data section 17 that stores the embedded logic when the consent information 13 is embedded in the header data section 16, the annex data section 17 is synthesized together with the header data section 16 and the real data section 15 to produce the synthetic data 12 (refer to FIG. 3).

The synthetic data 12 thus produced is recorded in a CD-ROM, a DVD, a photo-electric-magnetic disk (MO), an MD, a floppy disk or other recording medium, and then transmitted to the user, or distributed directly to the information device such as a personal computer of the user through the internet, and then stored in a hard disk.

Contents Use

Figure 7:
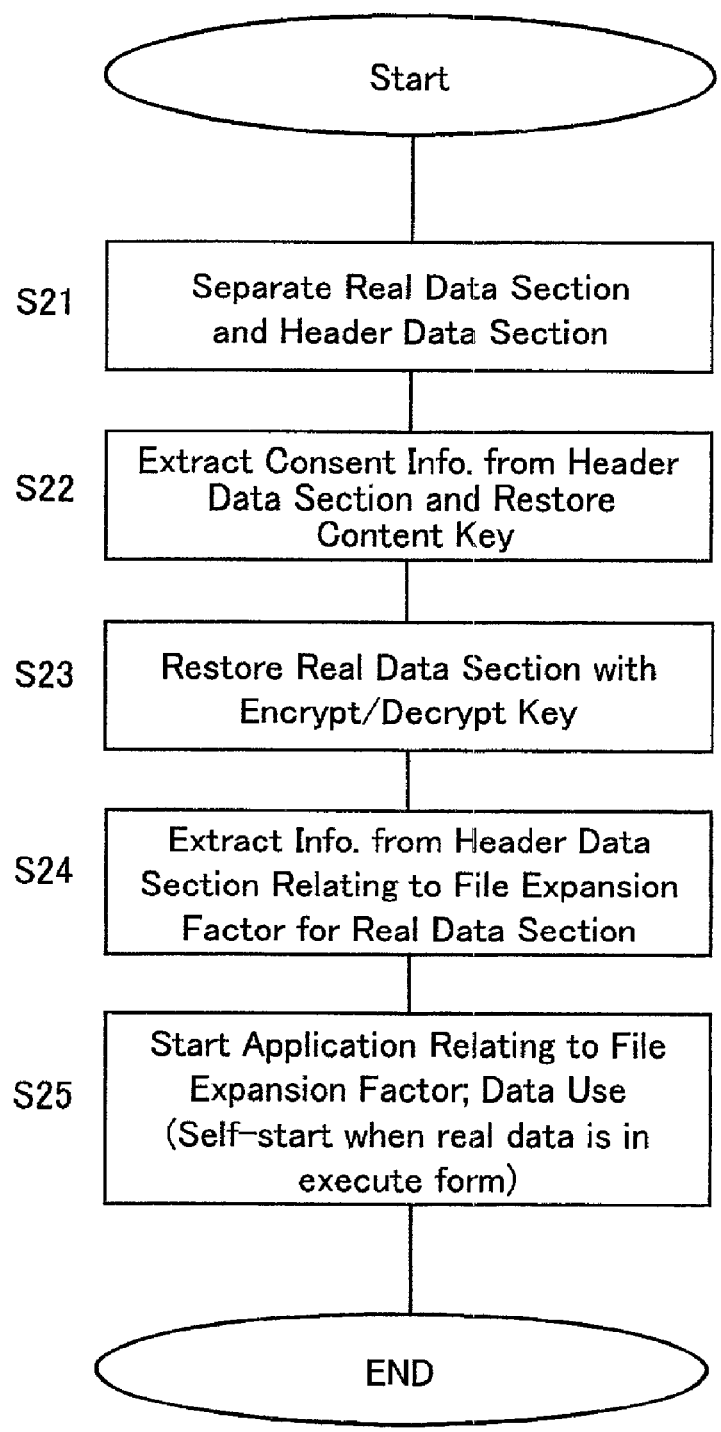
FIG. 7 is a flowchart showing the outline of the control.

A case where the distributed synthetic data 12 is utilized at the contents user 3 side will be described with reference to a flowchart shown in FIG. 7.

In step S21, the real data section 15 and the header data 16 are separated from the synthetic data 12. In the case where there is the annex data section 17, the annex data section 17 is separated at the same time.

In Step S22, the consent information 13 embedded in the header data section 16 as the electronic watermark is extracted, and the contents key is decoded from the consent information 13. The consent information 13 embedded in the header data section 16 as the electronic watermark by the given embedded logic, and the consent information 13 can be extracted by using the predetermined embedded logic between the contents manager 2 and the contents user 3.

In the case where the electronic watermark embedded logic is stored in the annex data section 17, the embedding logic information is extracted from the annex data section 17, and the consent information 13 is extracted on the basis of the embedding logic information. In the case where the positional information pertaining to a position in which the electronic watermark is embedded and the size of the electronic watermark is stored in the annex data section 17, the positional information is extracted from the annex data section 17 and then used to extract the consent information 13.

The consent information 13 is encrypted by the encryption key based on the user information 14 and can be decoded by using the user information 14. In the case where the user information 14 is a password, the password is inputted by the user and the inputted password is used to decode the consent information 13. Also, in the case where the consent information is encrypted by the ID information of the information device such as the serial No. of the CPU, the serial No. of the media drive, and so on, the ID information of the information device presently used is obtained, and the consent information 13 is decoded on the basis of the ID information. In addition, in the case where the consent information is encrypted by the biometric information of the user, the biometric information of the user is inputted and then analyzed into the characteristic information caused by the end point, the branch point and so on, and the consent information is decoded by the characteristic information.

If the password received from the user, the ID information of the information device presently used by the user, the characteristic information based on the biometric information received from the user, and so on are normal, the just contents key is restored from the consent information 13.

In Step S23, the real data section 15 is decoded by using the restored contents key to restore the digital content. The restored digital content developed on the hard disk at the contents user 3 side or other recording mediums and then stored therein.

In step S24, the file expansion factor information defined in the symbol information is extracted on the basis of the symbol information recorded in the header data section 16 and then associated with the restored digital content.

In Step S25, an application associated with the file expansion factor information is started on the basis of a command from the user, and the digital content are used. If the restored digital content are an execution-format file, the application is started by itself if there is a designation of the file without waiting for the start of the application by the user.

Certification Method Due to Biometric Information

Figure 9:
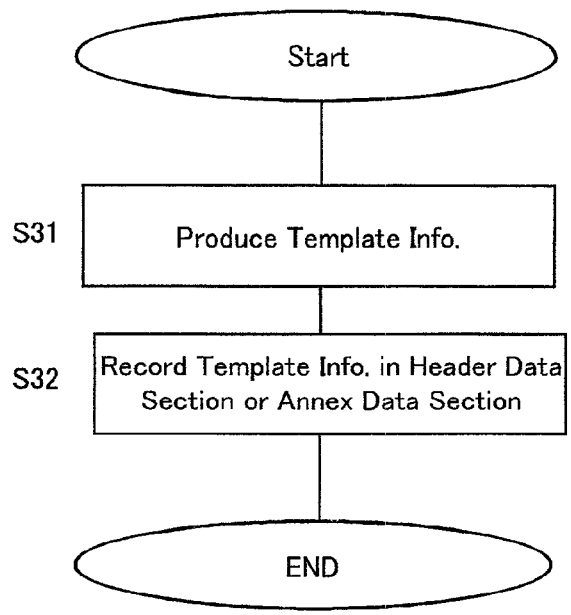
FIG. 9 is a flowchart showing the control when the fingerprint information for certification is recorded in synthetic data.

The user who will use the digital content can conduct the certification of whether there is a just user or not by using the biometric information of the user. The biometric information may be the fingerprint information, the iris information, the retina information, the voiceprint information, and so on as described above. In this example, a case where the certification is conducted by using the fingerprint information will be described with reference to FIGS. 9 and 10.

In the case where the user certification is conducted on the basis of the fingerprint information of the user, the fingerprint image of the user is registered at the contents manager 2 side in advance. In Step S31, the template information that conducts comparison with the fingerprint to be examined is produced on the basis of the registered fingerprint image of the user.

In the case of conducting comparison due to the characteristic information called "manusha" such as the end point or the branch point of the fingerprint image, the characteristic information is extracted from the fingerprint registered and then registered as the template information.

In the case of using a method of conducting pattern matching with the binary coding image of the fingerprint to be examined with the registered fingerprint image of the user as a fining image, the fining image is produced from the registered fingerprint image of the user and then regarded as the template information.

In Step S32, the template information produced from the registered fingerprint image of the user is recorded in the header data section 16 or the annex data section 17. In the case where the template information is recorded in the header data section 16, the template information can be embedded as the invisible electronic watermark. Also, in case of a data structure having the annex data section 17, the template information can be stored in the annex data section 17.

Figure 10:
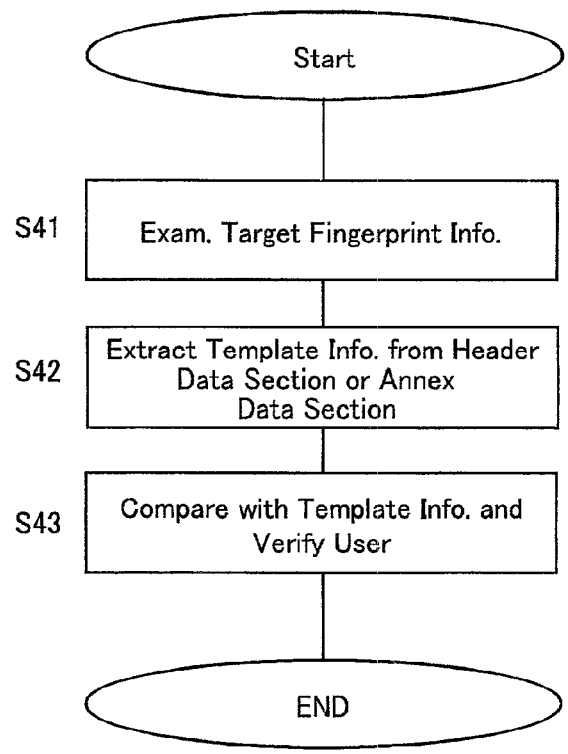
FIG. 10 is a flowchart showing the control when the user's certification is conducted by the fingerprint information.

The content user 3 side conducts user's certification operation on the basis of a flowchart shown in FIG. 10.

In Step S41, the fingerprint of the user is read by a fingerprint reading device located at the contents user 3 side, and the fingerprint information to be examined is obtained from the fingerprint image. As described above, in the case of conducting comparison on the basis of the characteristic of the fingerprint, the characteristic information based on the end point, the branch point and so on is produced from the read fingerprint image. Also, in the case of conducting pattern matching with the fining image, a binary coded image is produced from the read fingerprint image.

In Step S42, the template information recorded in the header data section 16 or the annex data section 17 is extracted. In the case where the template information is recorded in the header data section 16 as the electronic watermark, the template information is extracted from the header data section 16 by the given embedding logic.

In Step S43, the fingerprint information to be examined is compared with the template information to conduct the user's certification. In the case of conducting the comparison on the basis of the characteristic information, the characteristic information obtained from the fingerprint image to be examined is compared with the template which is the characteristic information obtained from the registered fingerprint of the user to conduct the user's certification on the basis of the comparison result. Also, in the case of conducting the comparison due to the fining image, the binary coded information of the fingerprint image to be examined and the fining image obtained from the registered fingerprint of the user are pattern-matched with each other to conduct the user's certification on the basis of the result.

Contents Use Information

If the information pertaining to the user such as user information 14 is embedded in the digital content, the use state can remain within the digital content. For example, if the user information 14 on the user to which the information is distributed is embedded in the digital content on the synthetic data 12 that conducts distribution, the information on the user to which the information is first distributed can remain. Also, if the user information 14 on the user is obtained at the time of using the digital content, and the user information 14 is embedded in the digital content, the history of the user can remain.

Figure 11:
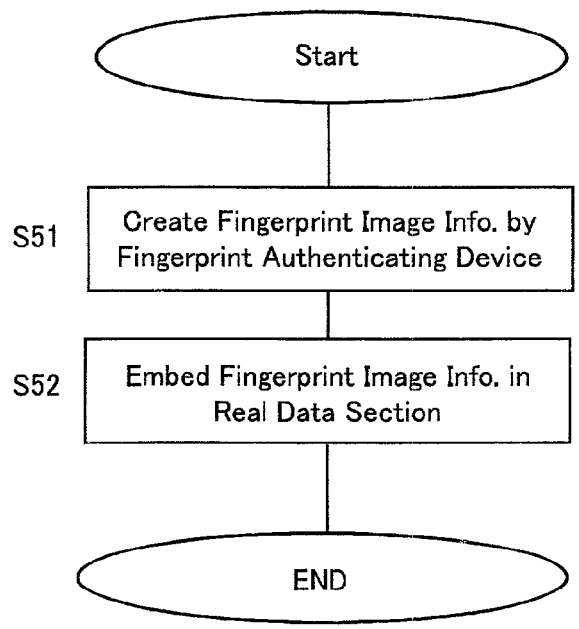
FIG. 11 is a flowchart showing the control when the fingerprint information is embedded in a real data section.

A case where the used fingerprint information on the user is embedded in the digital content will be described with reference to a flowchart shown in FIG. 11.

In Step S51, the fingerprint image information on the user who is going to use the digital content is produced.

In Step S52, the fingerprint image information of the user is embedded in the digital content of the synthetic data.

For example, it is proposed that at the contents manager 2 side, the previously registered fingerprint image information on the user to which the information is distributed is embedded in the digital content contained in the synthetic data 12 to be distributed as an invisible electronic watermark. In this case, the fingerprint image information on the user who first conducts the distribution is embedded in the digital content, and even if the information is unfairly copied, its source can be discriminated.

Also, when the digital content is going to be used, the fingerprint image information on the user can be obtained and embedded in the digital content. In this case, the fingerprint image information on the user to be used can be embedded in the digital content as an invisible electronic watermark. In this case, even if the information is going to be unfairly used, the history information of the user remains in the digital content, and a route along which the data unfairly flows out can be known.

Electronic Watermark Embedding Logic

Figure 12:
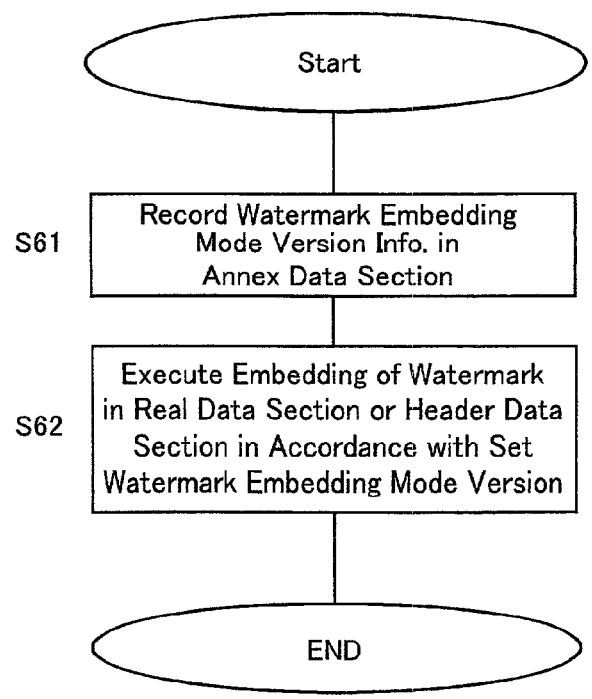
FIG. 12 is a flowchart showing the control when information pertaining to the an electronic watermark embedding logic is contained in the synthetic data.

As described above, in the case where the consent information 13 is embedded in the summary data section 16 as the invisible electronic watermark, the information on the embedding logic used when embedding the consent information 13 can be provided within the synthetic data 12. It is proposed that other than the consent information 13, biometric information on the user, the privileges information pertaining to the copyright and the like may be embedded as electronic watermark, and also it is proposed that the biometric information on the user, the privileges information pertaining to the copyright, the use information pertaining to the use term or the number of times of use of limit, and so on may be embedded in the digital content. If the kind of the embedding logic of the electronic watermark and the version information contained in the data section 16 and the real data section 15 are stored in the annex data section 17, respectively, the use at the contents user 3 side is facilitated. The operation will be described with reference to flowcharts shown in FIGS. 12 and 13.

In Step S61, the kind data of the embedding logic of the electronic watermark and the version information contained in the header data section 16 of the synthetic data 12 to be distributed and the real data section 15, respectively, are stored in the annex data section 17.

Figures 13, 14:
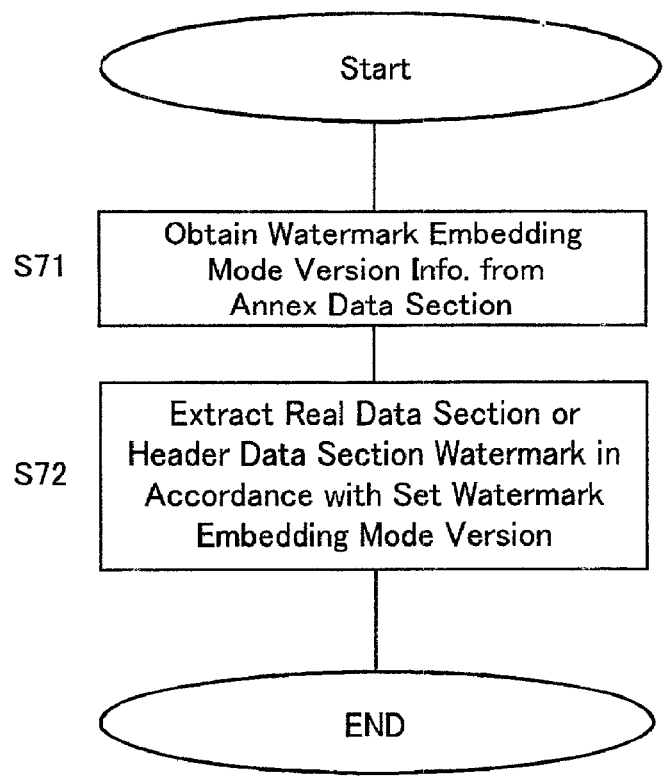
FIG. 13 is a flowchart showing the control when the information is extracted by using the electronic watermark embedding logic recorded in the synthetic data.
FIG. 14 is an explanatory diagram showing a table indicative of an example of information pertaining to the electronic watermark embedding logic.

For example, the embedding logic used in the header data section 16 and the real data section 15 can be defined as in a table shown in FIG. 14. In this example, the kind of the embedding logic and the version information used in the header data section 16 and the kind of the embedding logic and the version information used in the real data section 15 are arranged in order into a four-digit numeric value, and the embedding logic is defined on the basis of the numeric value.

In Step S62, a process of embedding the electronic watermark in the header data section 16 and the real data section 15, respectively, is executed in accordance with the embedding logic set in the annex data section 17.

In the case where the electronic watermark data is extracted from the distributed synthetic data 12 at the contents user 3 side, the operation is based on the flowchart shown in FIG. 13.

In Step S71, the information on the embedding logic is obtained from the annex data section 17 in the synthetic data 12.

In step S72, the electronic watermark embedded in the header data section 16 and the real data section 15 is extracted on the basis of the information on the obtained embedding logic. The obtained information on the embedding logic is made up of the kind of the embedding logic and the version information of the header data section 16 and the kind of the embedding logic and the version information of the real data section 15 as mentioned above, and the respective electronic watermark information can be extracted on the basis of those information.

Hash Value of Real Data Section

In order to detect the alteration of the digital content, the replacement of data, an error during communication and so on, the hash value of the real data section 15 can be produced and recorded in the synthetic data 12. The hash value is a pseudo-random number having a fixed length obtained by using a hash function, and is produced by a non-reversible one-way function so that the original cannot be reproduced from the hash value.

Figure 15:
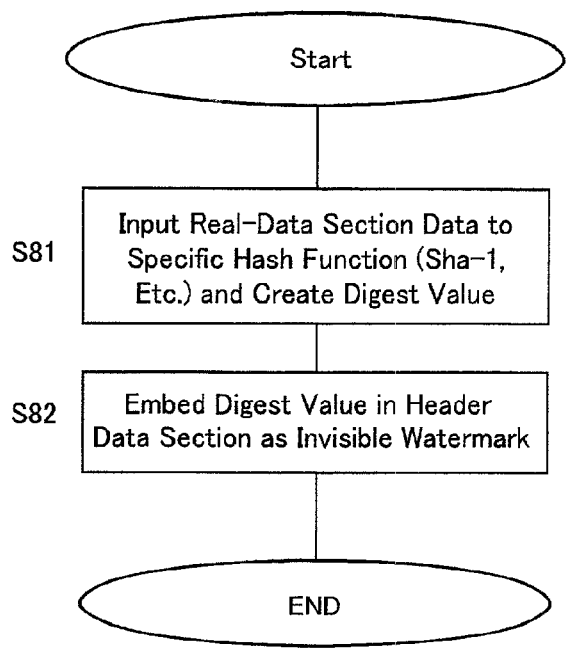
FIG. 15 is a flowchart showing the control when the hash value of the real data section is embedded in the header data.
Figure 16:
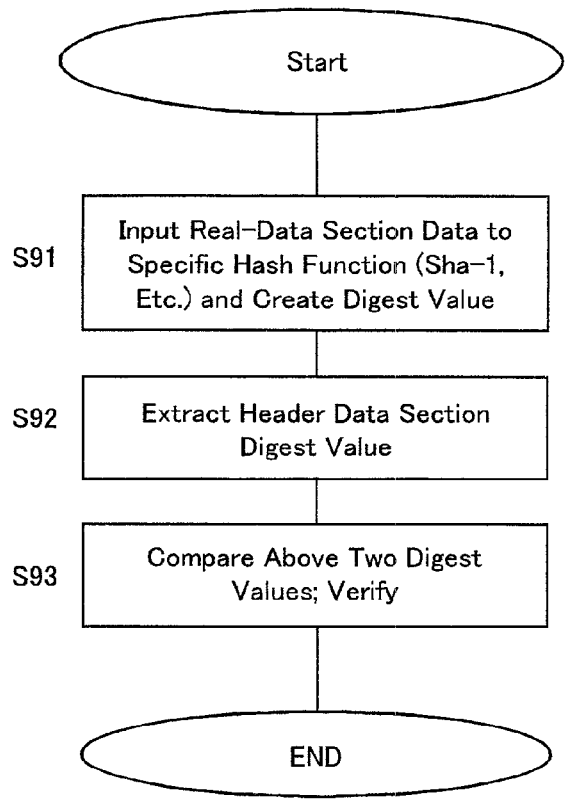
FIG. 16 is a flowchart showing the control when the presence/absence of something wrong in the data is verified by the hash value of the real data section.

A case in which the hash value of the header data section 15 is embedded in the header data section 16 will be described with reference to flowcharts shown in FIGS. 15 and 16.

In Step S81, the data of the real data section 15 is inputted to a specific hash function to produce the hash value. As the real data section that obtains the hash value, there can be data of the digital content before being encrypted, or the real data section encrypted by the contents key. Also, the hash function can be SHA-1, MD5 or others.

In Step S82, the produced hash value of the real data section 15 is embedded in the header data section 16 as an invisible electronic watermark. The embedding logic of the electronic watermark can be defined by the embedding logic kind and the version information as described above.

The hash value of the real data section 15 contained in the synthetic data 12 is obtained and compared with the hash value embedded in the header data section 16, thereby being capable of verifying that unfair such as the replacement of data is made. The operation will be described with reference to a flowchart shown in FIG. 16.

In Step S91, the data of the real data section 15 contained in the synthetic data 12 is inputted to a specific hash function to obtain the hash value. In this example, it is necessary to use the same hash function as the hash value embedded in the header data 16 as the electronic watermark.

In Step S92, the hash value embedded in the header data section 16 of the synthetic data 12 is extracted. The hash value is embedded in the header data section 16 as the electronic watermark on the basis of the above-mentioned embedding logic, and the hash value for verification can be obtained by extraction on the basis of the embedding logic.

In Step S93, the hash value of the real data section 15 produced by the hash function is compared with the hash value for verification extracted from the header data section 16 and it is verified whether they are identical with each other, or not.

As described above, the hash value of the real data section 15 is embedded in the header data section 16, as a result of which it is possible to recognize that the digital content contained in the synthetic data 12 is altered, and that the data is unfairly replaced.

Server Recorded Location Information

Figure 17:
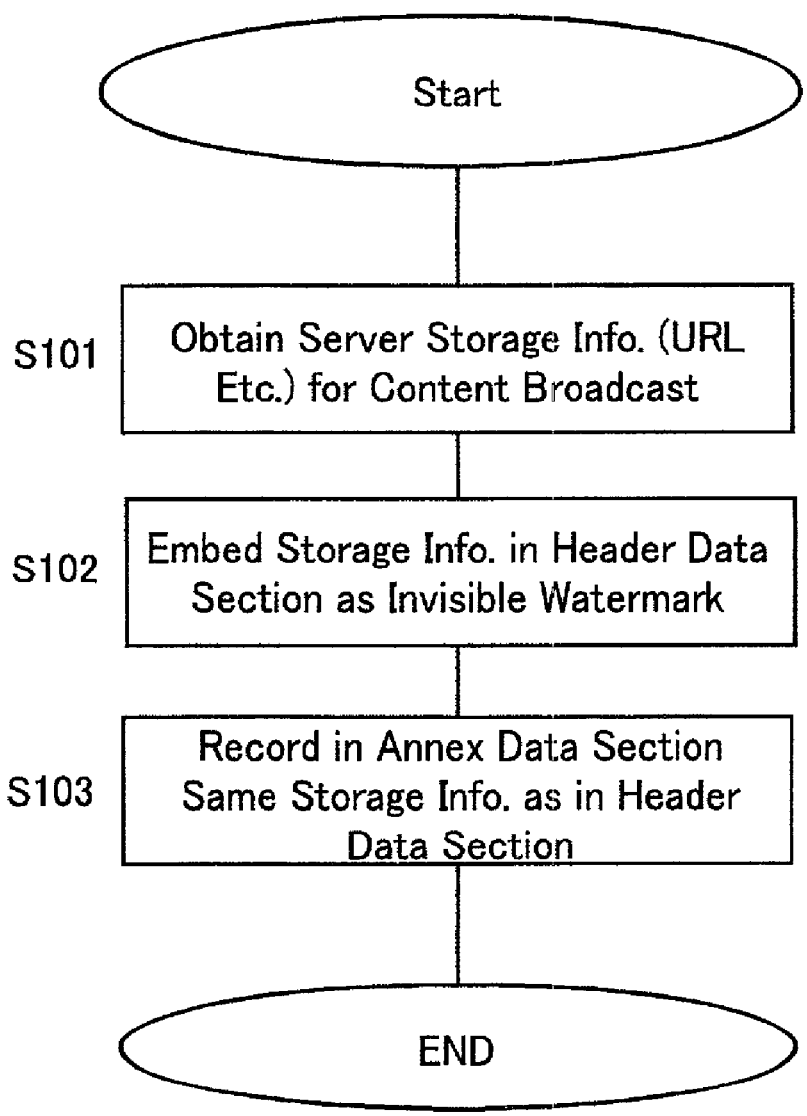
FIG. 17 is a flowchart showing the control when the information pertaining to the recorded location of the management server of the digital content is recorded in the synthetic data.
Figure 18:
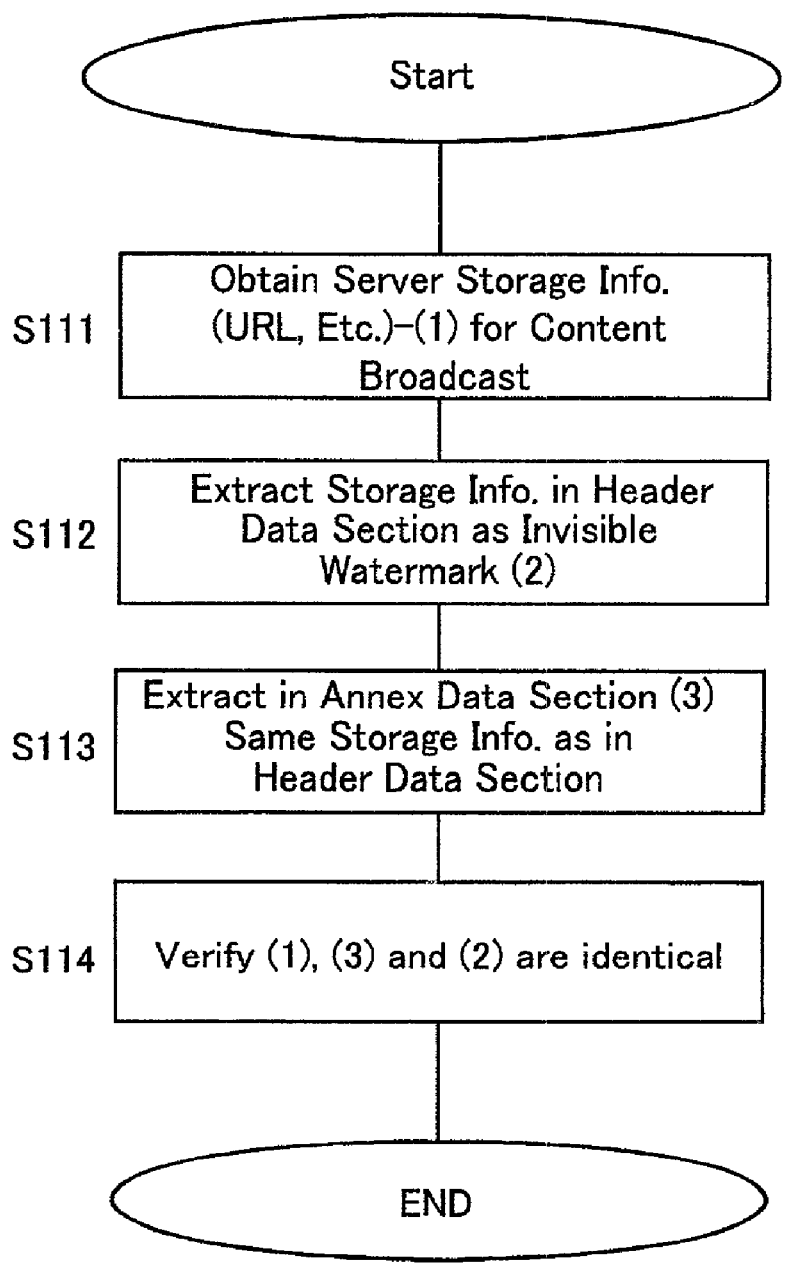
FIG. 18 is a flowchart showing the control when the presence/absence of something wrong is verified by using the information pertaining to the recorded location of the management server of the digital content.

The recorded location information on the server that manages the digital content contained in the distributed synthetic data 12 can be contained in the synthetic data 12. The operation will be described with reference to flowcharts shown in FIGS. 17 and 18.

In Step S101, the storage information of the server that manages the distributed digital content is obtained. In this case, a URL indicative of a location where the digital content is stored within the server, and so on are obtained as the storage information.

In Step S102, the storage information is embedded in the header data section 16 as an invisible electronic watermark. Similarly, in this case, the electronic watermark can be embedded by using the embedding logic set in the same manner as the previous example.

In Step S103, the same storage information as that embedded in the header data section 16 is stored in the annex data section 15.

If the URL of the server that manages the distributed digital content, the storage information embedded in the header data section 16 and the storage information stored in the annex data section 15 are verified, it can be recognized that the digital content are normally used.

In Step S111, the recorded location information of the server that manages the digital content is obtained.

In step S112, the storage information embedded in the header data section 16 is extracted. In this case, the storage information is extracted by using the embedding logic corresponding to the header data section 16 as described above.

In Step S113, the storage information stored in the annex data section 17 is extracted.

In Step S114, the storage information on the server, the storage information extracted from the header data section 16 and the storage information extracted from the annex data section 17 are compared with each other, and it is verified whether they are the same value, or not.

In case of the above structure, even if the header data section 16, the real data section 15 and the annex data section 17 are separated and unfairly used, it is possible to find out the unfair use by comparing the respective storage information and verifying them. Also, even if the storage information embedded in the header data section 16 and the storage information stored in the annex data section 17 are replaced in the same manner, because they are compared with the storage information on the server that manages the digital content for verification, it is possible to find out the unfair use.

Security Request and Image Quality Request

In the case where the electronic watermark is embedded in the digital content which is image data, there arises a problem that the image quality is deteriorated to some degree. Therefore, it is proposed that the visible electronic watermark is embedded in the digital content that require the high image quality. Also, there is a case where it is unnecessary to encode the digital content low in the security request. The form of the electronic watermark and the presence/absence of the encrypting can be set on the respective digital content on the basis of the image quality request and the security request.

A method of producing the real data section 15 on the basis of the image quality request and the security request when the digital content are taken in as the data within the synthetic data 12 will be described on the basis of a flowchart shown in FIG. 19.

In Step S121, the image request information and the security request information are inputted. For example, as shown in FIG. 20, the image quality request information and the security request information are set to "LOW" and "HIGH", respectively, and the form of the electronic watermark and the presence/absence of the encrypting can be set in accordance with their combination.

Figures 19, 20:
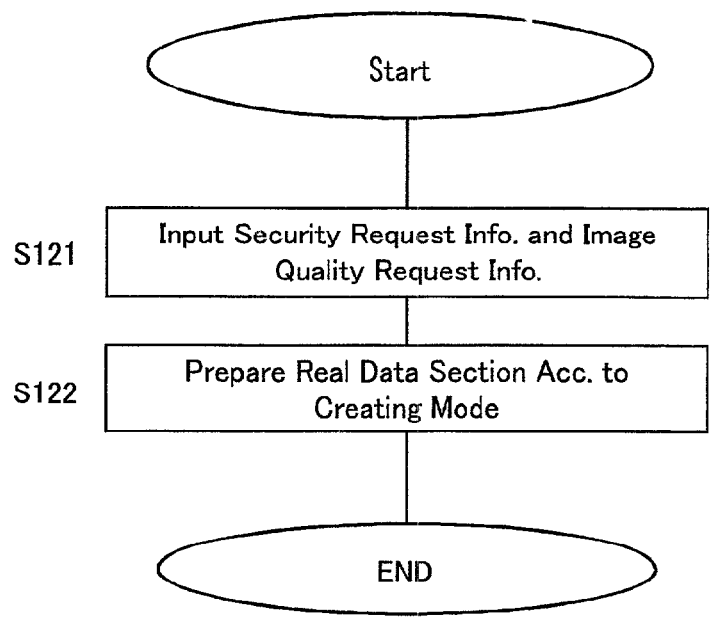
FIG. 19 is a flowchart showing the control when a method of producing the real data section is determined on the basis of the image quality request information and the security request information.
FIG. 20 is an explanatory diagram showing a method of producing the real data section determined on the basis of the image quality request information and the security request information.

In Step S122, the form of the electronic watermark and the presence/absence of the encrypting are determined with reference to a table shown in FIG. 20 on the basis of the inputted image quality request information and the security request information to execute the production of the real data section 15.

In this case, it is possible to prevent the image quality of the digital content high in image quality request from being deteriorated without using the invisible electronic watermark. Because the copyright information and information pertaining to the copyright, etc., are embedded as the visible watermark, it is possible to prevent the unfair use.

Also, the digital content high in security request is encrypted by using the contents key so that the security effect can be maintained, and the digital content low in the security request omits the encrypting, whereby a reduction in a period of time for producing the synthetic data at the time of distribution and a reduction in a period of time for starting at the time of using can be made.

Other Embodiments (A) The contents manager 2 or other specific contacted information can be embedded in the header data section 16 together with the electronic watermark. In this case, at the time of using the digital content within the synthetic data 12 at the user side, the line is connected to the third party extracted from the header data section 16 so as to send out the contents information.

The use state of the distributed digital content can be monitored at the contents manager 2 side, thereby being capable of preventing the unfair use.

(B) The sample data representative of the contents of the digital content contained in the synthetic data 12 is extracted, and the sample data can be regarded as the header data section.

For example, in the case where the digital content 11 include the image data, the representative image data is extracted from those image data, and the consent information 13 is embedded in the image data as described above so as to produce the consent information added header data section 16.

In the case where the digital content 11 are music data or audio data, a part of them is sampled so that the contents of the digital content can be understood.

In addition, it is possible to use the audio data obtained by reading the title or the summary of the respective digital content, and in this case, the data can be dealt with in the same manner that a part of the digital content which are the music data is sampled and regarded as the header data section.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A data administration method, which comprises:
   preparing a real data section by encrypting digital content to be distributed;
   preparing a summary data section provided with symbol information symbol-converted for visual or auditory recognition of attributes of the digital content;
   preparing a consent-information-added summary data section in which consent information containing information on a content key used as an encryption key in encrypting the digital content is embedded in the summary data section as an electronic watermark; and
   preparing composite data in which the real data section and the consent-information-added summary data section are composited, and distributing the composite data.

2. The data administration method as set forth in claim 1, wherein said data section is made by compositing into one image data item more than one image-symbol data item symbol-converted for visually recognizing attributes corresponding respectively to a plurality of digital content items.

3. A data administration method, which comprises:
   preparing a real data section by encrypting digital content to be distributed;
   preparing a data section enabling visual or auditory recognition of substance of the digital content;
   preparing a consent-information-added summary data section in which consent information containing information on a content key used as an encryption key in encrypting the digital content is embedded in the summary data section as a visually or auditorily unrecognizable electronic watermark;
   preparing an annex data section in which use restriction information for restricting use of the digital content is encrypted;
   preparing composite data by compositing the real data section and the consent-information-added summary data section, simultaneously compositing the annex data section; and
   distributing the composite data.

4. The data administration method as claimed in claim 3, wherein the use restriction information is embedding logic for embedding the consent information as the electronic watermark in the summary data section.

5. The data administration method as set forth in claim 3, wherein the use restriction information is based on a use term during which, or on a use count up to which, the digital content is usable.

6. The data administration method as set forth in claim 3, wherein the use restriction information is encrypted with, as an encryption key, personal information on a user of the digital content.

7. The data administration method as set forth in claim 6, wherein the encryption key when encrypting the use restriction information is a password preset by the user.

8. The data administration method as set forth in claim 6, wherein the encryption key when encrypting the use restriction information is identifying information specific to a recording medium in which the composite data is recorded.

9. The data administration method as set forth in claim 6, wherein the encryption key when encrypting the use restriction information is biometric information on the user.

10. A data administration method, comprising:

separating an annex data section from composite data distributed as a composite of a real data section in which digital content to be distributed is encrypted, in a summary data section enabling visual or auditory recognition of substance of the digital content, a consent-information-added summary data section in which consent information containing information on a content key used as an encryption key in encrypting the digital content is embedded as a visually or auditorily unrecognizable electronic watermark, and an annex data section in which use restriction information for restricting use of the digital content is encrypted;

decrypting the annex data section and extracting the use restriction information;

extracting the consent information embedded in the consent-information-added summary data section based on the use restriction information;

obtaining from the consent information a content key for decrypting the digital content; and using the content key, decrypting the real data section into its original digital content to allow use by users.

11. A data administration method characterized by:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content is embedded in the summary data section as a visually or auditorily unrecognizable electronic watermark;

embedding in the summary data section as a visually or auditorily unrecognizable electronic watermark a hash value generated from the real data section using a hash function; and thereafter preparing composite data in which the real data section and the consent-information-added summary data section are composited, and distributing the composite data.

12. A data administration method characterized by:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content is embedded in the summary data section as a visually or auditorily unrecognizable electronic watermark; and decrypting the real data section into digital content for sending out, by line-connecting to a predetermined contact destination, content information from the digital content that is decrypted, and therein embedding in the summary data section as a visually or auditorily unrecognizable electronic watermark the content information from the digital content that is decrypted and information on the predetermined contact destination; and thereafter preparing composite data in which the real data section and the consent-information-added summary data section are composited, and distributing the composite data.

13. A data administration method characterized by:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content is embedded in the summary data section as a visually or auditorily unrecognizable electronic watermark;

preparing composite data in which the real data section and the consent-information-added summary data section are composited, and therein retaining within the composite data record-location information from a server in which the digital content is registered; and distributing the composite data.

14. The data administration method as set forth in claim 13, characterized in that the record-location information from the server in which the digital content is registered is embedded in the summary data section as a visually or auditorily unrecognizable electronic watermark.

15. A data administration method characterized by:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content is embedded in the summary data section as a visually or auditorily unrecognizable electronic watermark; and preparing composite data in which the real data section and the consent-information-added summary data section are composited, and therein retaining within the composite data biometric template information generated based on biometric information on a user of the digital content; and distributing the composite data.

16. The data administration method as set forth in claim 15, characterized in that the biometric template information is embedded in the summary data section as a visually or auditorily unrecognizable electronic watermark.

17. A data administration method characterized by:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content, and identifying information specific to a recording medium for recording the digital content, are embedded in the summary data section as a visually or auditorily unrecognizable electronic watermark; and preparing composite data in which the real data section and the consent-information-added summary data section are composited, and distributing the composite data.

18. A data administration method characterized by:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content, and a control code allowing a given operation on an information device for reproducing the digital content, are embedded in the summary data section as a visually or auditorily unrecognizable electronic watermark; and preparing composite data in which the real data section and the consent-information-added summary data section are composited, and distributing the composite data.

19. A data administration method, which comprises:

preparing a real data section by encrypting digital content to be distributed;

preparing a summary data section enabling visual or auditory recognition of substance of the digital content;

preparing a consent-information-added summary data section in which consent information containing information on a content key used as an encryption key in encrypting the digital content is embedded in the summary data section as a visually or auditorily unrecognizable electronic watermark; and preparing composite data by compositing the real data section and the consent-information-added summary data section, and distributing the composite data; characterized in that privileges information for the digital content including copyright information is embedded within the digital content as an electronic watermark.

20. The data administration method as set forth in claim 19, characterized in that morphology and code level of the electronic watermark embedded in the digital content are determined based on a data quality level and a security level required by the digital content.

* * * * *